US012773941B2

(12) United States Patent
Cord et al.

(10) Patent No.: US 12,773,941 B2
(45) Date of Patent: Oct. 27, 2026

(54) CARRIAGE CARRYING SYSTEM

(71) Applicant: Stanley Robotics, Versailles (FR)

(72) Inventors: Aurélien Cord, Paris (FR); Mathieu Lips, Paris (FR); Clément Boussard, Paris (FR)

(73) Assignee: Stanley Robotics, Versailles (FR)

( * ) Notice: Subject to any disclaimer, the term of this patent is extended or adjusted under 35 U.S.C. 154(b) by 922 days.

(21) Appl. No.: 17/997,966

(22) PCT Filed: Apr. 29, 2021

(86) PCT No.: PCT/FR2021/050743
§ 371 (c)(1),
(2) Date: Nov. 4, 2022

(87) PCT Pub. No.: WO2021/224567
PCT Pub. Date: Nov. 11, 2021

(65) Prior Publication Data

US 2023/0173970 A1 Jun. 8, 2023

(30) Foreign Application Priority Data

May 4, 2020 (FR) ...................................... 2004401

(51) Int. Cl.
*B60P 3/077* (2006.01)
*B60P 1/02* (2006.01)
*B60W 60/00* (2020.01)

(52) U.S. Cl.
CPC ............... *B60P 3/077* (2013.01); *B60P 1/025* (2013.01); *B60W 60/00* (2020.02)

(58) Field of Classification Search
CPC .. B60P 3/07; B60P 3/077; B60P 1/025; B60P 1/6418
USPC ...................................................... 280/6.151
See application file for complete search history.

(56) References Cited

U.S. PATENT DOCUMENTS 2,454,641 A 11/1948 Figmick
4,310,271 A 1/1982 Canellis et al.
4,934,898 A * 6/1990 Galbreath ............ B60P 1/6454 414/500
5,033,567 A * 7/1991 Washburn ................ B60P 3/42 296/190.08

(Continued)

FOREIGN PATENT DOCUMENTS

CN 110573401 A 12/2019
DE 102017209791 A1 12/2018

(Continued)

OTHER PUBLICATIONS

Boussard WO2016189233 English Translation (Year: 2016).*

(Continued)

*Primary Examiner* — Jason D Shanske
*Assistant Examiner* — Caitlin Anne Miller
(74) *Attorney, Agent, or Firm* — TraskBritt

(57) ABSTRACT

The present disclosure relates to a system for transporting articles or loads, the system being formed by at least one carriage comprising a platform provided with at least two axles supporting wheels, and a carrying vehicle, wherein the carrying vehicle is a self-propelled vehicle comprising a platform that can be slid underneath one of the carriages, the platform comprising means for lifting the carriage high enough to prevent contact of the wheels with the ground.

12 Claims, 2 Drawing Sheets

(56) References Cited

U.S. PATENT DOCUMENTS

| | | | | |
|---|---|---|---|---|
| 5,882,177 | A * | 3/1999 | Stephens | B60P 3/075<br>414/800 |
| 6,168,367 | B1 * | 1/2001 | Robinson | B62B 3/1404<br>414/539 |
| 6,196,776 | B1 * | 3/2001 | Pienaar | B60P 3/08<br>410/24 |
| 8,165,718 | B2 * | 4/2012 | Ota | B66F 9/063<br>700/250 |
| 11,312,415 | B2 * | 4/2022 | Tzivanopoulos | B60S 13/00 |
| 2002/0146306 | A1 | 10/2002 | Morrell | |
| 2019/0284033 | A1 | 9/2019 | Yamamoto et al. | |
| 2019/0322205 | A1 * | 10/2019 | Dombrowski | B60S 13/00 |
| 2022/0073330 | A1 * | 3/2022 | Cord | B66F 9/0754 |

FOREIGN PATENT DOCUMENTS

| | | | | |
|---|---|---|---|---|
| FR | 2979609 | B1 | 3/2014 | |
| WO | 2016/189233 | A1 | 12/2016 | |
| WO | WO-2018224343 | A1 * | 12/2018 | B60P 3/077 |

OTHER PUBLICATIONS

Lumera WO2018224343 English Translation (Year: 2018).*

International Search Report for International Application No. PCT/FR2021/050743 dated Sep. 3, 2021, 2 pages.

International Written Opinion for International Application No. PCT/FR2021/050743 dated Sep. 3, 2021, 5 pages.

Chinese Office Action and Search Report for Application No. 202180032984.X dated Jan. 23, 2026, 10 pages with machine translation.

* cited by examiner

CARRIAGE CARRYING SYSTEM

CROSS-REFERENCE TO RELATED APPLICATIONS

This application is a national phase entry under 35 U.S.C. § 371 of International Patent Application PCT/FR2021/050743, filed Apr. 29, 2021, designating the United States of America and published as International Patent Publication WO 2021/224567 A1 on Nov. 11, 2021, which claims the benefit under Article 8 of the Patent Cooperation Treaty to French Patent Application Serial No. FR2004401, filed May 4, 2020.

TECHNICAL FIELD

The present disclosure relates to the field of industrial carriage tractors. These industrial carriage tractors pull one or more wagons, consisting of four-wheeled carriages, the number varying according to the nature and quantity of the material to be loaded or unloaded. These carriages comprise a coupling device formed by a drawbar provided at the front of the carriage and a hook provided at the rear of a tractor, in particular, a preceding carriage in a line of carriages, the drawbar and the hook being capable of cooperating with one another. Sometimes the drawbar drives a steerable axle supporting the front wheels so as to improve maneuverability. Usually, such a carriage comprises two steerable front wheels and two rear wheels, which may or may not be steerable. In known industrial carriages, as disclosed by U.S. Pat. No. 2,454,641, the drawbar is made in the form of a longitudinal element, hinged about a transverse axis of the carriage, and provided at its front part with a ring capable of cooperating with the hook of the tractor. The term “tractor” designates both a machine, motorized or not, that ensures the pulling of the carriage, and another carriage located immediately upstream in a line of carriages.

The conveyance trains concerned by the present disclosure are used in conveyance areas where the supply and/or the transit of loads is necessary and must be very flexible, both for the availability and for the modularity of the load capacity, such as, for example, in airports and/or train stations to ensure the transport of luggage and/or any other load in transit, in manufacturing plants, processing plants, production lines to ensure the supply of raw materials, parts and components to workstations as well as the removal of manufactured and/or assembled parts or sub-assemblies to other workstations, etc. This type of conveyance train makes it possible to transport loads in boxes, in containers, on pallets or in any other equivalent form, between several areas, which can be unloading, storage, manufacturing, mounting, assembly, loading, etc., areas. The conveyance train may or may not follow a predefined track and may travel on a closed-loop trajectory bringing it back, for example, to its starting point. It can also be programmed to perform standard routes and/or be provided with presence sensors to travel in automatic mode and avoid obstacles.

Industrial carriage tractors are usually driven by electric motors, which are powered by an electrical energy storage device, such as a battery. The battery is charged at a central airport hub, and it is not uncommon for the battery to drain during operation, particularly if heavy cargo is being transported. In the event of battery depletion, the industrial carriage tractor must be towed to the vehicle to be recharged by another vehicle or by a power outlet.

BACKGROUND

Known in the state of the art is French Patent Publication FR2979609 describing a trailer intended for the transport of trailers equipped with castors, on which “order preparation carriages” are deposited. The trailers are not motorized, but coupled together to form a train of trailers driven by a tractor vehicle.

International Patent Application Publication WO2016/189233 describes a mobile conveyor intended to move a four-wheeled vehicle, for the automatic parking of vehicles or the movement of motor vehicles during manufacture, which comprises a frame provided with arms that are movable between a position in which they allow the movement of the frame under the vehicle, and a position in which they come into contact with the treads of the wheels, wherein the frame is telescopic and comprises two segments each carrying a pair of arms.

This document does not relate to a system for transporting articles or loads with a plurality of loading carriages.

German Patent Application Publication DE102017209791 describes an autonomous transport device used to transport motor vehicles, which device comprises several wheels that allow it to move; a receiving device designed to receive a motor vehicle so that this motor vehicle is transported by means of the autonomous transport device; a motor designed to drive at least one of the wheels; a steering device designed to steer at least one of the wheels; and an autonomous control device designed to control the motor and the steering device, this autonomous control device being designed to allow the autonomous transport device to move autonomously.

This document describes an autonomous transport device used to transport motor vehicles and not loading carriages.

U.S. Pat. No. 4,310,271 A describes a container transport system for transporting a plurality of vehicles comprises a cargo container and at least one ramp inside the container. The ramp is disposable and is made of corrugated cardboard.

The solutions of the prior art have numerous drawbacks.

First, for the industrial carriage “trains,” there is a safety drawback: The drawbar generally has a significant length to allow the carriage to have a small turning radius and thus to perform U-turns in a small space. The tractor driver, sometimes pulling several carriages, has only limited visibility of the carriages and of the spaces between two consecutive carriages, especially if they are far from the tractor. The driver thus cannot see if a person is in the area swept by the consecutive carriages, and a person or an object is sometimes wedged between two carriages during the tight turning of the train of carriages.

A second drawback concerns flexibility: The transported loads do not necessarily have the same destination and are usually loaded and unloaded from the carriages using handling equipment such as forklifts. This requires the permanent availability of one or more forklift operators whose job is to deliver the load to the desired location. To limit the handling of loads and simplify logistics, some carriages can be uncoupled, which allows the load to be delivered directly with its carriage to the desired location and thus saves the need to move a handling appliance. Nevertheless, uncoupling the carriage requires a relatively long and tedious intervention time, which generates significant downtime of the conveyance train. To allow the conveyance train to continue on its way, the remaining carriages must be coupled. This intervention requires the driver of the conveyance train to perform maneuvers and also requires a long and tedious intervention.

A third drawback relates to the amount of investment required to ensure optimum availability of the loading and unloading means. Generally, the tractor is attached to a train of carriages throughout the loading, transport and unloading cycle, then the return of the train of unloaded carriages. However, the tractor is only necessary during the transport phase. During the other phases, it is immobilized unnecessarily.

The object of the present disclosure is to provide greater flexibility by mobilizing a self-propelled vehicle just for the moving phase of a loaded carriage.

BRIEF SUMMARY

In order to respond to the aforementioned drawbacks, the present disclosure relates, in its most general sense, to a system for transporting articles or loads formed by at least one industrial carriage comprising a platform provided with at least two axles supporting wheels, and a carrying vehicle, wherein the carrying vehicle is a self-propelled vehicle comprising a platform that can be slid underneath a carriage, the platform comprising means for lifting the carriage high enough to prevent contact of the wheels with the ground.

According to a first variant, the means for lifting the carriage comprise at least one actuator interacting with the lower surface of the carriage.

According to a second variant, the carrying vehicle includes a propulsion unit extended by a frame provided with arms for wedging the wheels of the carriage between a retracted position and a position in which they come into contact with the wheels of the carriage.

Advantageously, the propulsion unit comprises a front frame to which two lateral subassemblies are fixed each comprising a motorized and directional wheel that can be steered independently of one another and a means for coupling the frame with the front frame.

According to a particular embodiment, the frame is formed by a structure less than 100 millimeters thick comprising a wheel with a section of less than 100 millimeters operable vertically by a lift pad.

Preferably, the carrying vehicle comprises autonomous driving means.

BRIEF DESCRIPTION OF THE DRAWINGS

The present disclosure will be better understood on reading the following description, relative to a non-limiting embodiment illustrated by the accompanying drawings, in which.

DETAILED DESCRIPTION

Figure 1:
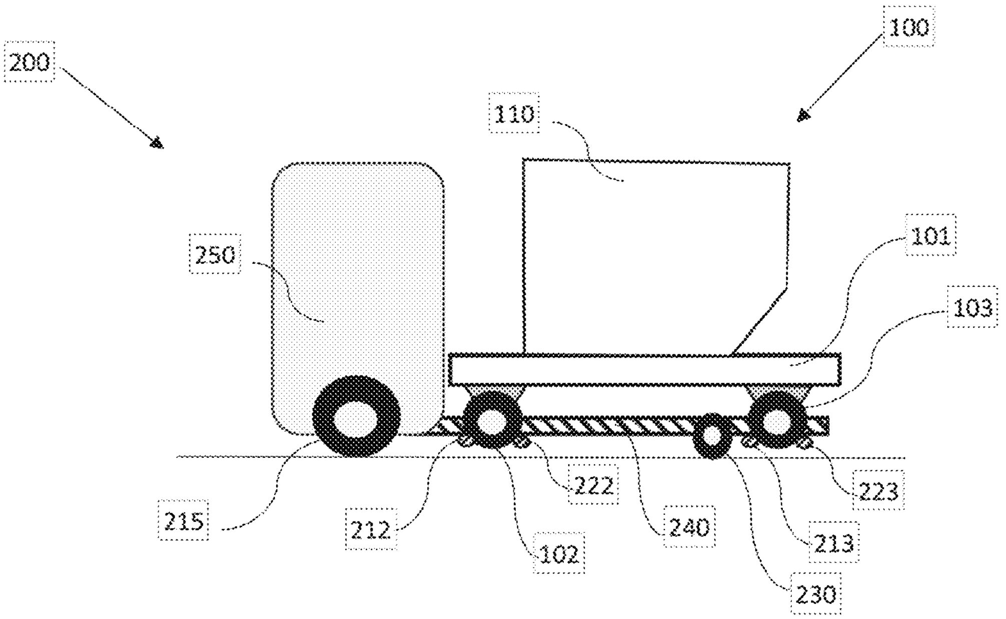
FIG. 1 shows a schematic side view of a system according to a first embodiment variant of the present disclosure.
Figure 2:
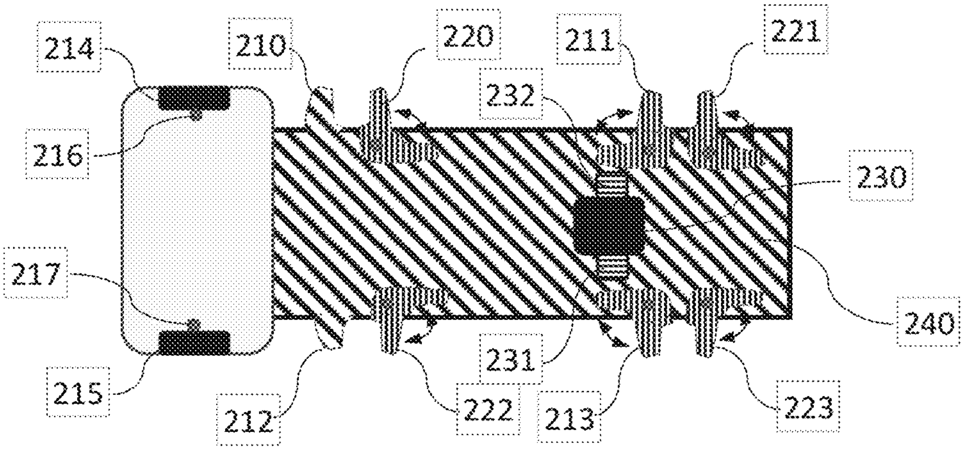
FIG. 2 shows a schematic bottom view of a system according to a first embodiment variant of the present disclosure.
Figure 3:
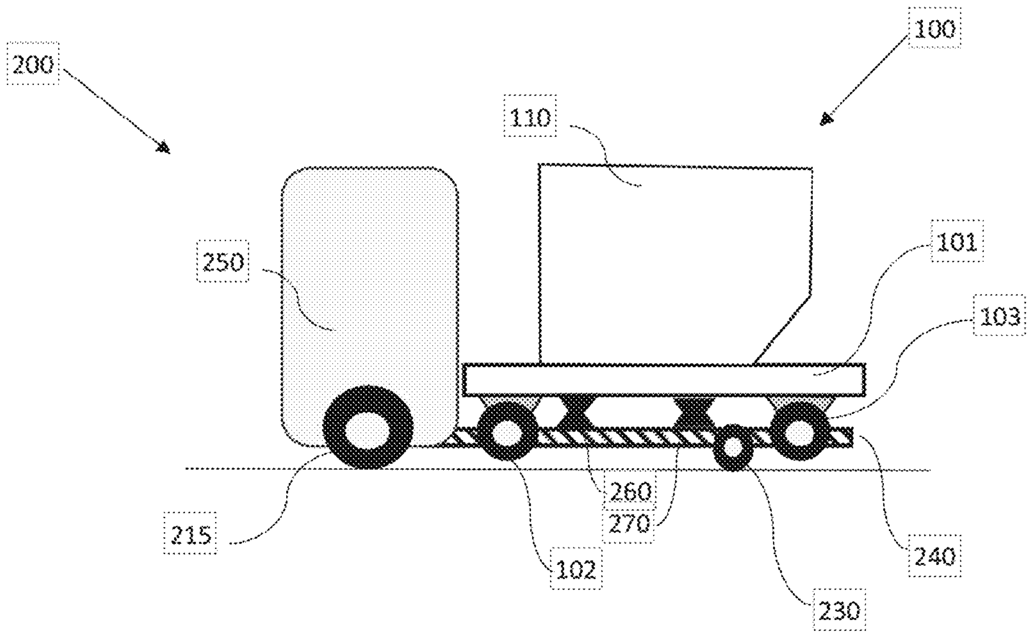
FIG. 3 shows a schematic bottom view of a system according to a second embodiment variant of the present disclosure.

As shown in FIGS. 1-3, the system according to the present disclosure comprises a carriage (100) and a carrying vehicle (200). The carrying vehicle (200) can be steered by a driver, and in this case comprise a cabin, or can be autonomous for automated travel without a driver.

The carriage (100) can be a "standard" carriage, in particular, a carriage used for loading and unloading baggage or cargo containers (110) in airports, for example. It comprises a frame (101) supporting a front axle and a rear axle, generally hinged and linked to a drawbar or a hitching ball, and comprises wheels (102, 103).

The carrying vehicle (200) includes a self-propelled unit (250) provided with a pair of motorized wheels (214, 215), pivoting independently with respect to guide axes (216, 217). This self-propelled unit (250) is extended by a platform (240) whose dimensions are adapted to allow sliding between the wheels (102, 103) of a carriage (100) passing under the frame (101).

In a first embodiment variant shown in FIG. 2, the platform (240) of the carrying vehicle (200) comprises arms (210, 220; 211, 221; 212, 222; 213, 223) in this first variant that are hinged to allow placement on the tread of the wheels (102, 103), respectively, in order to be able to lift the carriage, or to retract to allow the platform (240) to be positioned under the carriage.

The platform (240) further comprises at least one wheel (230) mounted on an inflatable pad (231, 232), making it possible to lift or lower the platform (240).

The two arms (210, 212) closest to the self-propelled unit are fixed. They abut against the tread of the carriage tires when the platform (240) is slid under the carriage frame. During this step of positioning the platform (240) under the carriage (100), the other arms are tilted to disappear, and when the arms (210, 212) come into abutment, actuators cause the other arms (220, 222) to pivot so as to block the front wheels (102) of the carriage (100), then cause the rear arms (211, 221; 213, 223) to tilt so as to block the rear wheels (103) of the carriage (100).

Second Embodiment Variant

In a second embodiment variant shown in FIG. 3, the platform (240) of the carrying vehicle (200) has dimensions (width, height) allowing it to be slid under the frame (101) of the carriage (100), then to be lifted by two actuators (260, 270) coming into contact with the lower surface of the frame (101) to lift it high enough that the wheels no longer come into contact with the ground.

Use

This solution makes it possible to optimize the organization of loading and unloading for the supply and/or transit of loads. The carriages are placed on the storage and/or retrieval sites and can be moved manually or pulled by conventional tractors within the perimeter of the loading or unloading areas. When a carriage is ready to be transferred, any of the carrying vehicles can come and position themselves under the carriage to move it without waiting for an entire ream of carriages to be loaded. After transport, the carrying vehicle is removed from the carriage and the carrying vehicle is available for further movement.

This thus avoids immobilizing tractors in the loading or unloading areas, and bringing together a train of carriages connected by drawbars, the handling of which is delicate and which can cause accidents.

The invention claimed is:

1. A system for transporting articles or loads, comprising:

at least one carriage including a carriage platform and at least two axles supporting wheels; and a carrying vehicle, wherein the carrying vehicle is a self-propelled vehicle comprising a vehicle platform configured to slide underneath the at least one carriage, the vehicle platform comprising means for lifting the at least one carriage high enough to prevent contact of the wheels with the ground, the carrying vehicle includes two lateral subassemblies comprising a motorized and directional wheel configured to be steered independently of one another, wherein the means for lifting the at least one carriage includes at least one actuator configured to contact and interact with a lower surface of the at least one carriage, and wherein the carriage platform includes at least one wheel mounted on an inflatable pad configured to lift and lower the vehicle platform.

2. The system of claim 1, wherein the carrying vehicle comprises a propulsion unit and a frame extending from the propulsion unit, the frame provided with arms for wedging the wheels of the at least one carriage between a retracted position and a position in which they come into contact with the wheels of the at least one carriage.

3. The system of claim 2, wherein the propulsion unit comprises a front frame to which the two lateral subassemblies are fixed and a means for coupling the frame with the front frame.

4. The system of claim 3, wherein the frame comprises a structure less than 100 millimeters thick comprising a wheel with a section of less than 100 millimeters operable vertically by a lift pad.

5. The system of claim 1, wherein the carrying vehicle comprises an autonomous driving vehicle.

6. A system for transporting articles or loads, comprising:

at least one carriage including a carriage platform and at least two axles supporting wheels and two lateral subassemblies comprising a motorized and directional wheel configured to be steered independently of one another; and a self-propelled carrying vehicle comprising a vehicle platform configured to slide underneath the at least one carriage, the vehicle platform comprising a lifting mechanism for lifting the carriage off the ground, wherein the lifting mechanism for lifting the at least one carriage off the ground includes at least one actuator configured to contact and interact with a lower surface of the at least one carriage, and wherein the carriage platform includes at least one wheel mounted on an inflatable pad configured to lift or lower the vehicle platform.

7. The system of claim 6, wherein the lifting mechanism comprises at least one actuator configured to interact with the at least one carriage.

8. The system of claim 6, wherein the self-propelled carrying vehicle comprises a propulsion unit and a frame coupled to the propulsion unit, the frame provided with movable arms configured to move between a first position and a second position, the movable arms engaging at least two of the wheels of the at least one carriage when the at least one carriage is disposed over the frame and the moveable arms are in the second position.

9. The system of claim 8, wherein the propulsion unit comprises a front frame and the two lateral subassemblies coupled to the front frame and a means for coupling the frame with the front frame.

10. The system of claim 9, wherein the frame comprises a structure less than 100 millimeters thick comprising a wheel with a section of less than 100 millimeters operable vertically by a lift pad.

11. The system of claim 6, wherein the carrying vehicle comprises an autonomous driving vehicle.

12. A system for transporting articles or loads, comprising:

at least one carriage including a carriage platform and at least two axles supporting wheels; and a carrying vehicle, wherein the carrying vehicle is a self-propelled vehicle comprising a vehicle platform configured to slide underneath the at least one carriage, the carrying vehicle including at least one wheel mounted on an inflatable pad configured to lift or lower the vehicle platform and a lifting mechanism for lifting the at least one carriage that includes at least one actuator configured to contact and interact with a lower surface of the at least one carriage.

* * * * *